(12) United States Patent
Van Ess et al.

(10) Patent No.: US 8,093,825 B1
(45) Date of Patent: Jan. 10, 2012

(54) CONTROL CIRCUIT FOR OPTICAL TRANSDUCERS

(75) Inventors: David Van Ess, Arlington, WA (US); Patrick N. Prendergast, Clinton, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 406 days.

(21) Appl. No.: 11/985,201

(22) Filed: Nov. 13, 2007

Related U.S. Application Data (60) Provisional application No. 60/858,821, filed on Nov. 13, 2006.

(51) Int. Cl.
*H05B 37/02* (2006.01)

(52) U.S. Cl. .......................... 315/291; 315/294; 315/299

(58) Field of Classification Search .................. 315/137, 315/160, 172, 161, 185 R, 186, 192, 209 R, 315/210, 217, 224, 225, 226, 209 T, 246, 315/250, 287, 291, 294, 295, 297, 299, 300, 315/301, 307, 308; 386/1, 9, 10, 12, 13, 386/14, 16, 17, 34, 35, 42, 43, 44

See application file for complete search history.

(56) References Cited

U.S. PATENT DOCUMENTS

| | | |
|---|---|---|
| 3,582,882 A | 6/1971 | Titcomb et al. |
| 3,633,015 A | 1/1972 | Lee |
| 3,746,847 A | 7/1973 | Maritsas |
| 4,571,546 A | 2/1986 | Wilkinson |
| 4,680,780 A | 7/1987 | Agoston et al. |
| 5,065,256 A | 11/1991 | Suganuma et al. |
| 5,353,122 A | 10/1994 | Kim |
| 5,760,609 A | 6/1998 | Sharpe-Geisler |
| 5,912,572 A | 6/1999 | Graf, III |
| 5,912,573 A | 6/1999 | Graf, III |
| 5,917,350 A | 6/1999 | Graf, III |
| 5,929,676 A | 7/1999 | Graf, III |
| 6,016,038 A | 1/2000 | Mueller et al. |
| 6,150,774 A | 11/2000 | Mueller et al. |
| 6,338,765 B1 | 1/2002 | Statnikov |
| 6,587,248 B1 | 7/2003 | Gyoten |
| 6,628,249 B1 | 9/2003 | Kamikawa et al. |
| 6,630,801 B2 | 10/2003 | Schuurmans |
| 6,727,765 B1 | 4/2004 | Ess |
| 6,734,875 B1 | 5/2004 | Tokimoto et al. |
| 6,807,137 B2 | 10/2004 | Chuang |
| 6,864,989 B2 | 3/2005 | Storz et al. |
| 7,014,336 B1 | 3/2006 | Ducharme et al. |
| 7,095,439 B2 | 8/2006 | Hammadou |
| 7,256,552 B2 | 8/2007 | Ishii et al. |
| 7,319,298 B2 | 1/2008 | Jungwirth et al. |
| 7,372,902 B2 | 5/2008 | Matsushima |
| 7,573,210 B2 | 8/2009 | Ashdown et al. |
| 7,689,130 B2 | 3/2010 | Ashdown |
| 7,712,917 B2 | 5/2010 | Roberts et al. |
| 7,868,562 B2 | 1/2011 | Salsbury et al. |
| 7,915,838 B2 | 3/2011 | VanEss |

(Continued)

OTHER PUBLICATIONS

USPTO Non-Final Rejection for U.S. Appl. No. 11/811,108 dated Aug. 18, 2010; 6 pages.

(Continued)

*Primary Examiner* — Douglas W Owens
*Assistant Examiner* — Jianzi Chen (57) ABSTRACT

A method and apparatus for high-side control of an optical transducer provides improved current control and temperature compensation and uses stochastic modulation for improved spectral characteristics.

19 Claims, 7 Drawing Sheets

U.S. PATENT DOCUMENTS

| | | |
|---|---|---|
| 2004/0001040 A1 | 1/2004 | Kardach et al. |
| 2005/0140315 A1* | 6/2005 | Baldwin et al. ............... 315/308 |
| 2008/0111503 A1 | 5/2008 | Van Ess et al. |
| 2008/0180040 A1 | 7/2008 | Prendergast et al. |

OTHER PUBLICATIONS

USPTO Non-Final Rejection for U.S. Appl. No. 11/598,981 dated Jul. 26, 2010; 9 pages.

USPTO Non-Final Rejection for U.S. Appl. No. 11/598,981 dated Feb. 3, 2010; 14 pages.

Patrick Prendergast, Applications Engineer, Cypress Semiconductor Corporation, "Thermal Design Considerations for High-Power LED Systems," <http://www.automotivedesignline.com/howto/197700496; jsessionid=PJRTJPQ3NPS4SQS>, Automotive Design Line, Feb. 12, 2007; 6 pages.

USPTO Notice of Allowance for U.S. Appl. No. 10/186,466 dated Dec. 5, 2003; 5 pages.

USPTO Non-Final Rejection for U.S. Appl. No. 10/186,466 dated Jul. 30, 2003; 5 pages.

USPTO Notice of Allowance for U.S Appl. No. 08/825,489 dated Dec. 17, 1998; 3 pages.

USPTO Non-Final Rejection for U.S. Appl. No. 08/825,489 dated Jul. 17, 1998; 14 pages.

USPTO Notice of Allowance for U.S. Appl. No. 08/828,325 dated Dec. 21, 1998; 13 pages.

USPTO Non-Final Rejection for U.S. Appl. No. 08/828,325 dated Sep. 4, 1998; 7 pages.

USTPO Notice of Allowance for U.S. Appl. No. 08/825,359 dated Dec. 7, 1998; 1 page.

USTPO Non-Final Rejection for U.S. Appl. No. 08/825,359) dated Jul. 8, 1998; 11 pages.

USPTO Notice of Allowance for U.S. Appl. No. 11/811,108 dated Jun. 24, 2011; 8 pages.

USPTO Notice of Allowance for U.S. Appl. No. 11/811,108 dated Dec. 23, 2010; 4 pages.

* cited by examiner

LOW FREQUENCY SSDM

FIG. 3B

HIGH FREQUENCY SSDM

FIG. 3C

COMBINED SSDM SIGNAL

FIG. 3D

LED CONTROL SIGNAL

FIG. 3E

LED CURRENT

CONTROL CIRCUIT FOR OPTICAL TRANSDUCERS

This application claims priority to U.S. Provisional Patent Application No. 60/858,821, filed Nov. 13, 2006, the entire contents of which are hereby incorporated by reference herein.

TECHNICAL FIELD

The present invention relates to the control of optical transducers and, more particularly, to current control and sensing in optical transducers.

BACKGROUND

Light-emitting diode (LED) technology has advanced to the point where LEDs can be used as energy efficient replacements for conventional incandescent and fluorescent light sources. One application where LEDs have been employed is in ambient lighting systems using white and color (e.g., red, green and blue) LEDs. Like incandescent and fluorescent light sources, the average luminous flux of an LED's output is controlled by the average current through the device. Unlike incandescent and fluorescent light sources, however, LEDs can be switched on and off almost instantaneously. As a result, their luminous flux can be controlled by switching circuits that switch the device current between two current states to achieve a desired average current corresponding to a desired luminous flux. This approach can also be used to control the relative intensities of red, green and blue (RGB) LED sources (or any other set of colored LED sources) in ambient lighting systems that mix colored LEDs in different ratios to achieve a desired color.

Figure 1A:
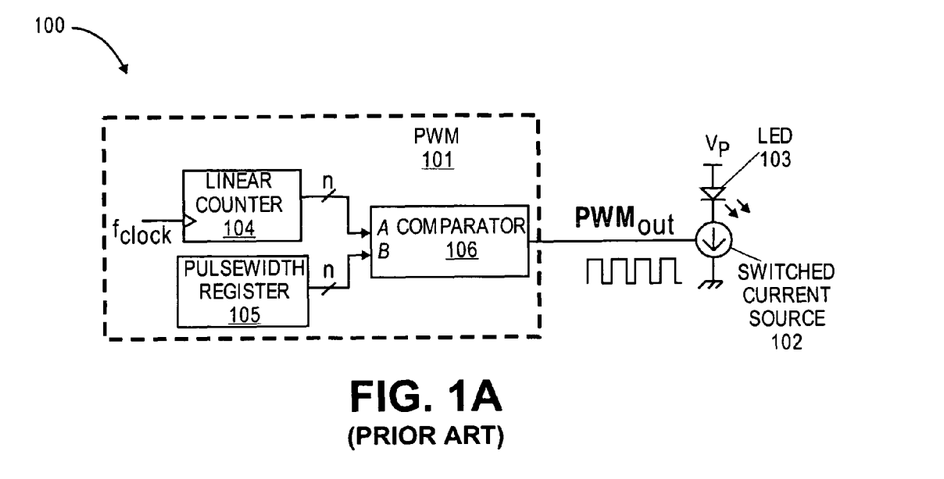
FIG. 1A illustrates conventional PWM brightness control of an optical transducer.

FIG. 1A illustrates a conventional LED light source 100, which includes a pulsewidth modulator (PWM) 101, a switched current source 102 referenced to ground, and an LED 103 floating between a supply voltage Vp and the high impedance side of the switched current source. The PWM 101 uses an n-bit linear counter 104 to count repetitively from 0 to $2^n-1$ over a period $T=2^n/f_{clock}$. A pulsewidth register 105 holds a value between 0 and $2^n-1$, representative of a desired duty cycle of the switched current source 102. A comparator 106 compares the value of the linear counter 104 to the value in the pulsewidth register. When the output of the counter is below the value in the pulsewidth register, the output of the comparator is low. When the output of the counter is at or above the value in the pulsewidth register, the output of the comparator is high. As a result, the duty cycle of the current source, and the average intensity of the LED, can be controlled by changing the value in the pulsewidth register.

Figure 1B:
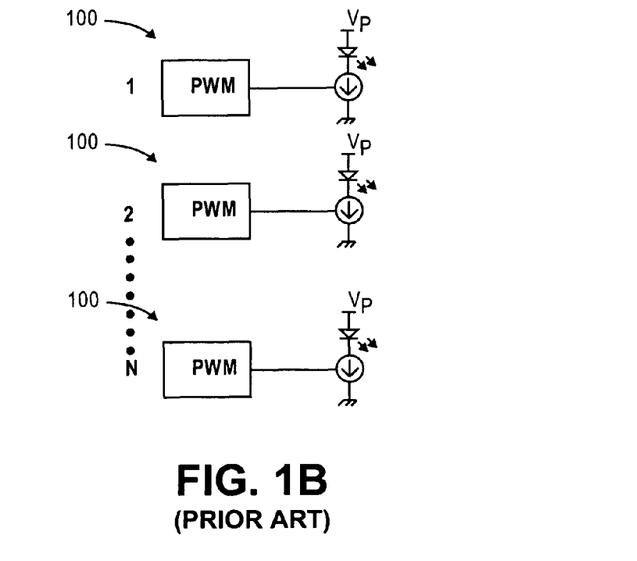
FIG. 1B illustrates conventional PWM brightness control of an array of optical transducers.

FIG. 1B illustrates an array of LED light sources, which may include different color LEDs (e.g., red, green and blue) in different intensity proportions to generate different colors in combination.

Figure 1C:
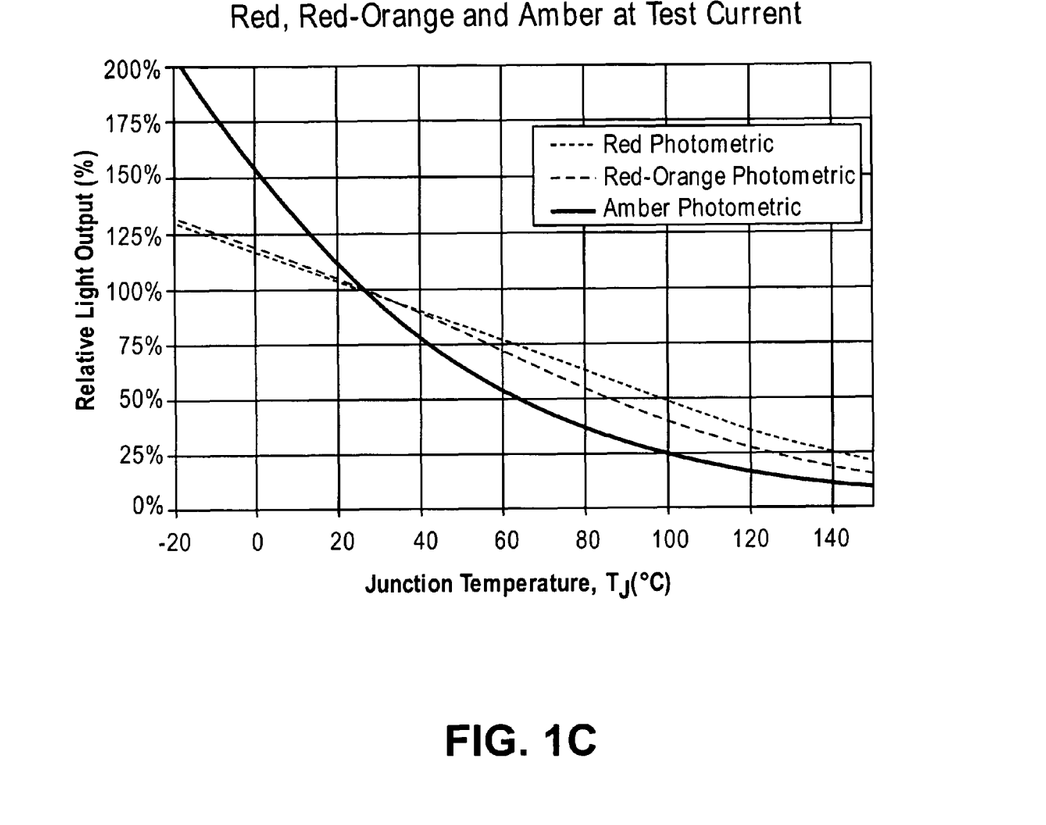
FIG. 1C illustrates the change in the luminous flux of LEDs as a function of junction temperature.

In LED lighting, the luminous flux output (intensity) of each LED at a given operating current decreases as the junction temperature of the LED increases. LED junction temperature can increase due to power dissipation in the LED and increases in ambient temperature. This effect, illustrated in the curves of FIG. 1C for three selected LEDs, can create both luminous flux errors and errors in color mixing because the magnitude of the effect is different for LEDs of different colors.

Another temperature effect in LEDs is a shift of the dominant wavelength of an LED as the junction temperature of the LED changes. Typically, the dominant wavelength increases as junction temperature increases, causing a red shift. This effect can cause additional color distortion independent of the luminous flux effects.

At any given operating current, the forward bias voltage of an LED is a function of the junction temperature of the LED. If the forward voltages of the LEDs in an illumination array are known, then the junction temperatures can be determined and the overall spectral output of the array (i.e., color and intensity) can be controlled and corrected for changes in the junction temperatures of the LEDs. However, measuring the forward voltage of the LEDs in the conventional configuration is difficult because the LEDs are floating above ground and have a high common-mode voltage. In the conventional configuration, the LED forward voltages are measured as floating differential voltages and have to be measured through level-shifting voltage dividers and differential amplifiers that add complexity and measurement error. Additionally, the voltage dividers can leak current from the LEDs to ground, reducing LED intensity at a given drive level or increasing current consumption at a given intensity level.

In conventional LED arrays, the PWM output frequency is fixed, and therefore the spectral content of the control signal is concentrated in the PWM fundamental frequency and its harmonics. This may cause electromagnetic radiation that is concentrated in a narrow frequency range that may interfere with the operation of other circuitry in the illumination system or the local electronic environment.

BRIEF DESCRIPTION OF THE DRAWINGS

The present invention is illustrated by way of example and not limitation in the figures of the accompanying drawings, in which.

DETAILED DESCRIPTION

Methods and apparatus for controlling optical transducers are described. In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

In one embodiment, a method includes controlling the intensity of an optical transducer with a high-side modulator, wherein the optical transducer is referenced to a ground potential, and independently controlling the peak intensity and average intensity of the optical transducer with stochastic signal density modulators.

Figure 2A:
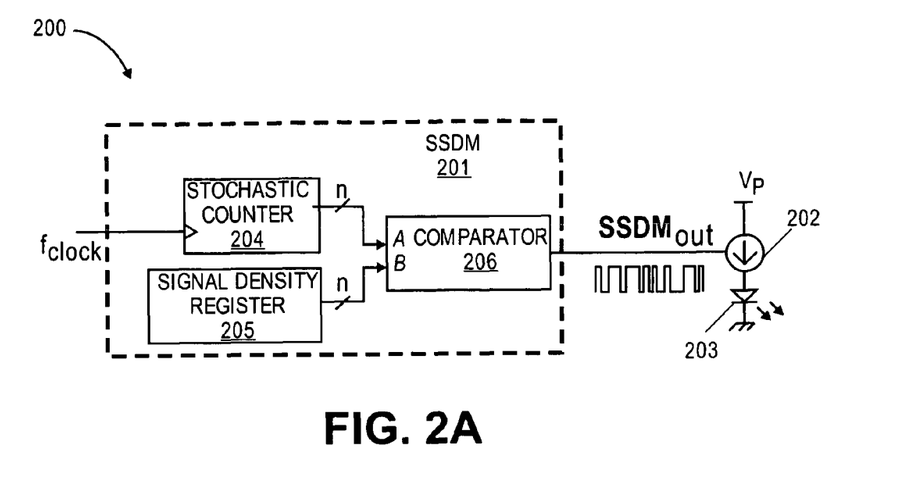
FIG. 2A illustrates high-side SSDM control of an optical transducer in one embodiment.
Figure 2B:
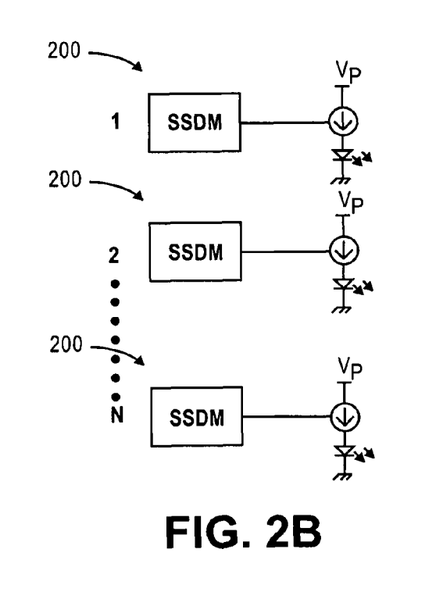
FIG. 2B illustrates high-side SSDM control of an optical transducer network in one embodiment.

In one embodiment of a high-side SSDM control circuit for optical transducers, as illustrated in FIG. 2A, a stochastic LED light source 200 includes a stochastic signal density modulator (SSDM) 201 and a controllable current source 202 located on the high-potential side of an LED 203 so that the LED is referenced to ground. As described in greater detail below, this configuration allows the forward voltage of the LED 203 to be measured directly with an instrumentation amplifier without level shifting circuitry that would be required in the conventional floating LED configuration. FIG. 2A illustrates a configuration where the cathode of LED 203 is connected to ground, the anode of LED 203 is connected to one terminal of controllable current source 202 and the other terminal of controllable current source 202 is connected to a supply voltage $V_P$. In the embodiment illustrated in FIG. 2A, $V_P$ would be a positive voltage and controllable current source 202 would source positive bias current to LED 203. In other embodiments, the orientation of LED 203 may be reversed, in which case $V_P$ would be a negative voltage and controllable current source 202 would source negative bias current to LED 203.

In one embodiment, stochastic signal density modulator 201 includes an n-bit stochastic counter 204, clocked by a signal $f_{clock}$, which generates a pseudorandom number sequence of numbers between 0 and $2^n-1$ every $2^n$ clock cycles, a signal density register 205 that stores a signal density value between 0 and $2^n-1$ and a comparator 206 to compare the output of the stochastic counter 204 with the signal density value in the signal density register 206. When the signal density value in signal density register 205 is greater than the output value of the stochastic counter 204, the output of comparator 206 is high. When the signal density value is less than or equal to the output value of the stochastic counter, the output of comparator 206 is low. As a result, the output signal ($SSDM_{OUT}$) from comparator 206 will have a pseudorandom distribution over the period of the stochastic counter 204, with an average value determined by the value in the signal density register 205, and with a spread spectrum (i.e., non-fixed) frequency response due to a non-constant output frequency. The configuration and operation of stochastic signal density modulators is described in detail in copending U.S. patent application Ser. No. 11/598,981 which is incorporated herein in its entirety by reference.

Figure 2C:
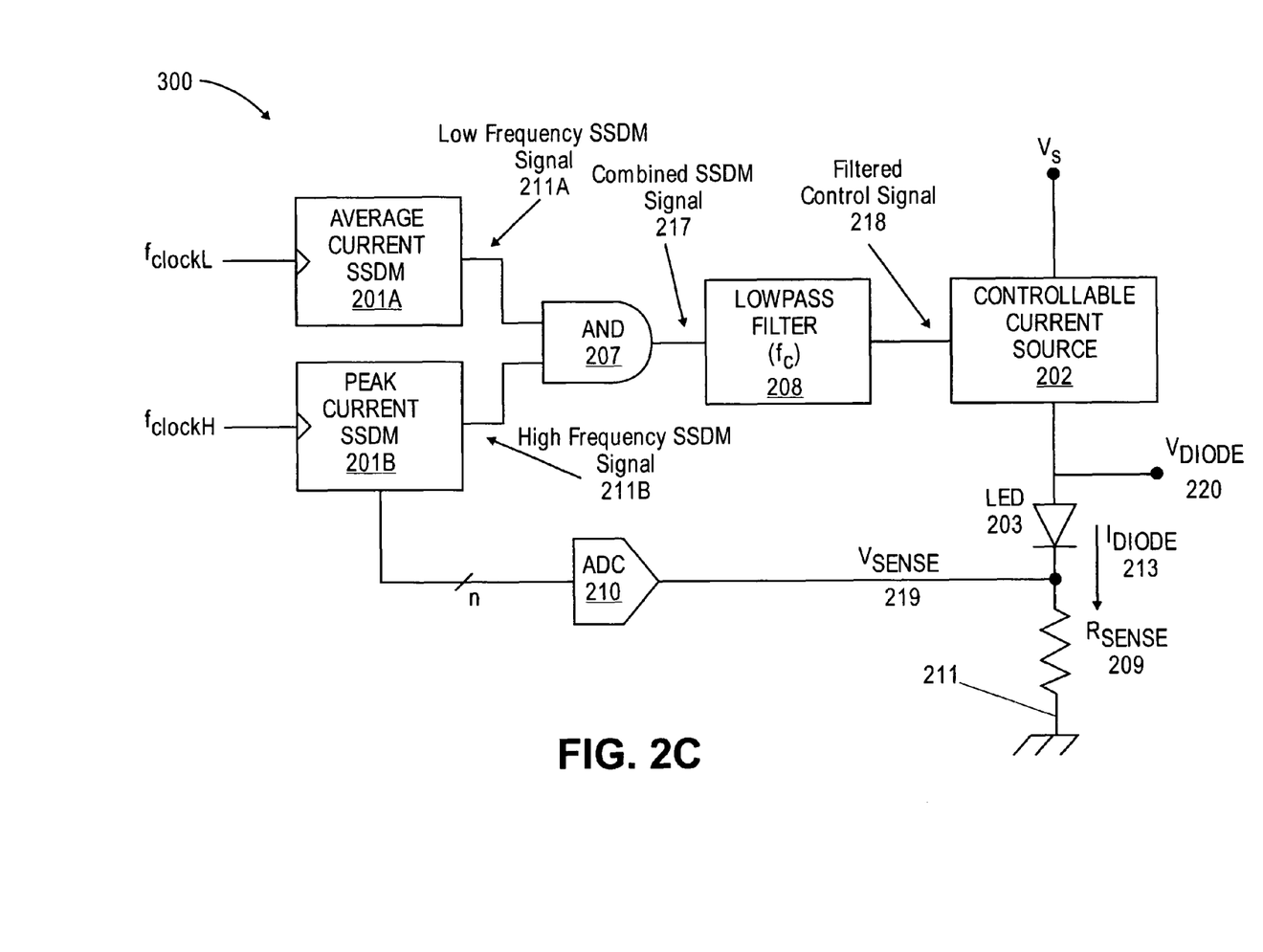
FIG. 2C illustrates high-side peak and average SSDM current control of an optical transducer in one embodiment.

In one embodiment, as illustrated in FIG. 2C, a high-side LED control circuit 300 includes a pair of SSDM control blocks to independently control the peak and average current of an LED. Circuit 300 includes an average current SSDM control block 201A driven by a low frequency clock signal $f_{clockL}$ and a peak current SSDM control block 201B driven by a high frequency clock signal $f_{clockH}$. Clock signals $f_{clockL}$ and $f_{clockH}$ are defined with respect to a cutoff frequency $f_C$ of a lowpass filter 208 as described below.

Figure 3A:
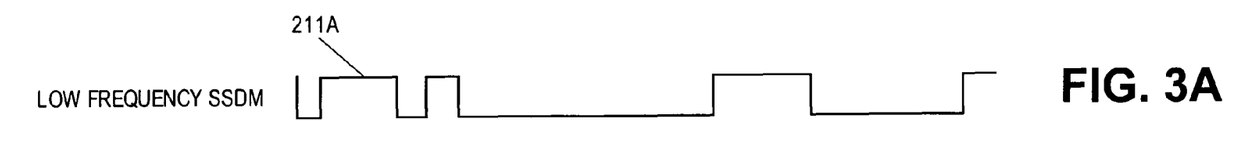
FIGS. 3A-3E illustrate waveforms for high-side peak and average SSDM current control of an optical transducer in one embodiment.
Figure 3B:
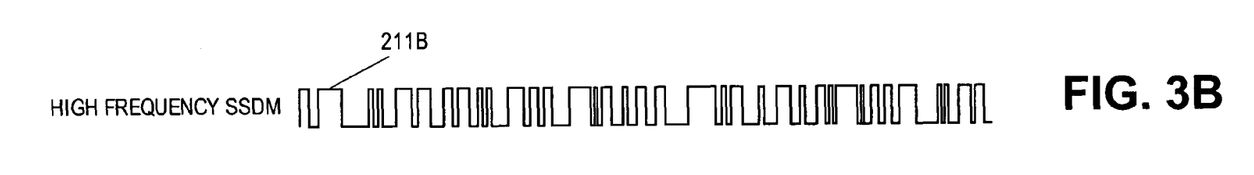
Figure 3C:
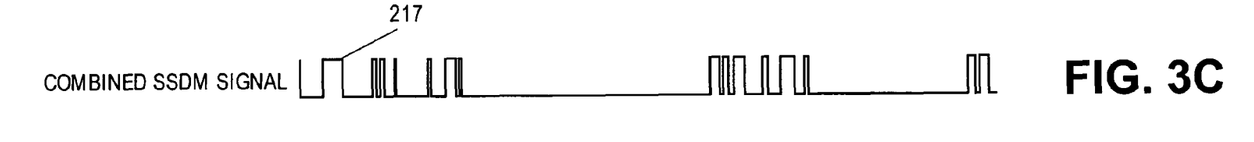

The output of average current SSDM control block 201A is a low frequency SSDM signal 211A as illustrated in FIG. 3A, with a signal density corresponding to the signal density value stored in its signal density register. The output of peak current SSDM control block 201B is a high frequency SSDM signal as illustrated in FIG. 3B, with a signal density corresponding to the signal density value stored in its signal density register. The high frequency and low frequency SSDM signals are combined at AND gate 207 to produce a combined SSDM signal 217 as illustrated in FIG. 3C. The combined SSDM signal 217 is applied to lowpass filter 208, which has a cutoff frequency $f_c$. Cutoff frequency $f_c$ is selected such that $f_c$ is greater than $f_{clockL}$ and less than $f_{clockH}$. In one embodiment, for example, $f_{clockL}$ may be approximately 5 kilohertz, $f_{clockH}$ may be approximately 1 megahertz and $f_c$ may be approximately 70 kilohertz.

Figure 3D:
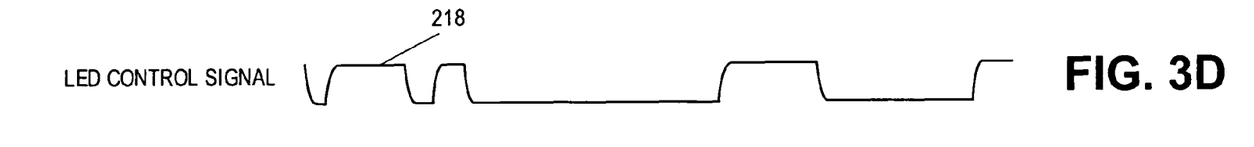
Figure 3E:
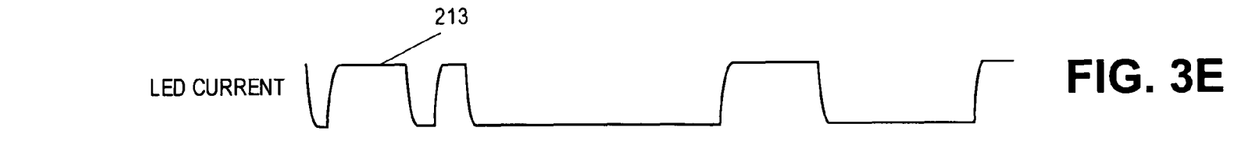

The output of lowpass filter 208 is a control signal 218, as illustrated in FIG. 3D, with a DC (direct current) level $V_{DC}$ determined by the DC component of high frequency SSDM signal 211B. Control signal 218 varies between $V_{DC}$ and a peak level $V_{PEAK}$ with a timing that follows low frequency SSDM signal 211A. Control signal 218 is applied to a controllable current source 202 that generates an LED current ($I_{LED}$) 213 through LED 203, as illustrated in FIG. 3E, that is proportional to control signal 218. LED current 213 has a minimum value $I_{MIN}$ that is proportional to $V_{DC}$ and a peak value $I_{PEAK}$ that is proportional to $V_{PEAK}$.

The peak value $I_{PEAK}$ of LED current 213 may be detected by a sense resistor $R_{SENSE}$ 209, connected between LED 203 and ground, which develops a voltage $V_{SENSE}$ 219 that is proportional to $I_{LED}$ 213. $R_{SENSE}$ may be a small value resistor (e.g., less than 1 Ohm) such that the voltage $V_{SENSE}$ is much less than the forward voltage across LED 203, which is typically in the range of 0.7 volts to 1.0 volts for silicon based LEDs. In one embodiment, for example, R SENSE may be approximately 0.1 Ohm and the peak value of $I_{LED}$ may be approximately 1 Ampere, such that the peak value of $V_{SENSE}$ is approximately 0.1 volt.

As illustrated in FIG. 2C, the analog sense voltage $V_{SENSE}$ may be converted to an n-bit digital value by an analog-to-digital converter (ADC) 210. The n-bit digital value may be compared to an n-bit signal density value in the signal density register (e.g., a signal density register such as signal density register 205) in peak current SSDM 201B. Methods for comparing digital values are known in the art and, accordingly, are not described in detail. If the n-bit digital value from ADC 210 differs by more than a specified amount from the n-bit signal density value in SSDM 201B, then the signal density value may be adjusted accordingly, up or down, to achieve a desired value of peak current in LED 203.

Figure 4:
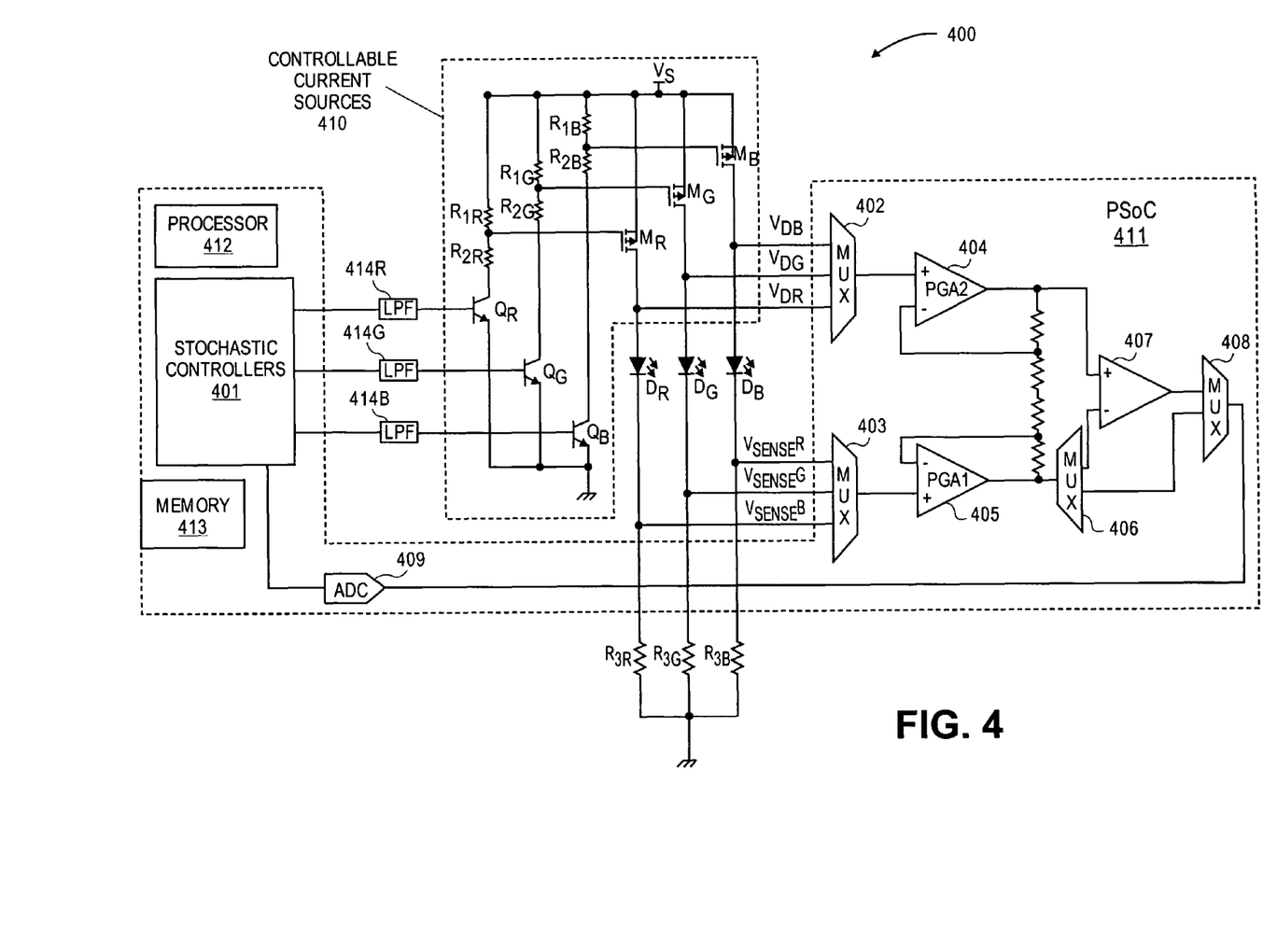
FIG. 4 illustrates a system for high-side stochastic control of an array of optical transducers in one embodiment.

FIG. 4 illustrates one embodiment of a system 400 for controlling an array of LEDSs. System 400 includes a stochastic controller block 401, which may include peak and average current SSDMs (such as SSDMs 201B and 201A) and an AND gate (such as AND gate 207) for each color channel. In one embodiment, as illustrated in FIG. 4, the array of LEDs may include a set of primary color LEDs such as a red LED ($D_R$), a green LED ($D_G$) and a blue LED ($D_B$). In other embodiments, the array of LEDs may include other primary or complementary sets of LEDs as well as one or more WHITE LEDs to control color saturation as is known in the art.

System 400 may also include a lowpass filter 414 for each color channel (i.e., 414R, 414G, 414B). The outputs of the lowpass filters drive controllable current sources 410, which includes a controllable current source for each color channel. In one embodiment, as illustrated in FIG. 4, each controllable current source may include a buffer transistor ($Q_R$, QG, QB), a voltage divider ($R_1$, $R_2$)$_{RGB}$ and a MOSFET driver transistor ($M_R$, $M_G$, $M_B$). The DC component ($V_{DC}$) of the filtered control signal in each channel (associated with the corresponding peak current SSDM for that channel) may be selected to drive a corresponding MOSFET in its "variable resistance region" to set a peak current level for that channel. The variable component of the filtered control signal in each channel (associated with the corresponding average current SSDM for that channel) may be selected to set the average current level for that channel by switching the MOSFET on and off in sequence with its SSDM waveform. Therefore, by adjustment of the values of the signal density registers in the SSDM blocks, the relative and absolute intensity of each LED can be controlled to achieve a desired color mix at a desired intensity level. The principles of color mixing and signal density control are described in copending U.S. patent application Ser. No. 11/811,108, which is incorporated herein in its entirety by reference. Each of the color channels may also include a sense resistor ($R_{3R}$, $R_{3G}$, $R_{3B}$) as described above, which may be used to sense the peak current in each of the LEDs. The use of low value resistors, as described above with respect to FIG. 2C, reduces the total voltage on the current source side of the LEDs and, in turn, increases the dynamic range and controllability of the controllable current sources.

System 400 may also include analog multiplexers (MUXs) and amplifiers to sample and process signals from each of the color channels. In one embodiment, a multiplexer 403 may be used to sample the current sense voltages $V_{SENSE}R$, $V_{SENSE}G$ and $V_{SENSE}B$. Another multiplexer 402 may be used to sample the LED voltages $V_{DR}$, $V_{DG}$ and $V_{DB}$. The selected signals from MUX 402 and MUX 403 may be buffered by amplifiers 404 and 405 respectively. MUX 406 and MUX 408 may be configured to measure the sense voltage in each color channel to determine the respective peak LED currents in each channel. MUX 406 and MUX 408 may also be configured to measure the forward voltage across each LED to determine the junction temperature of each LED as described above.

To measure the sense voltage of a channel selected by MUX 403, MUX 406 directs the output of buffer amplifier 405 to MUX 408. In turn, MUX 408 directs the sense voltage to ADC 409, which converts the analog sense voltage to a digital value as described above. To measure the forward voltage across one of the LEDs, MUX 402 and MUX 403 select the same channel and direct the respective sense and LED voltages to buffer amplifiers 404 and 405. The output of buffer amplifier 404 is routed to one input of buffer amplifier 407. The output of buffer amplifier 405 is directed to the other input of buffer amplifier 407 by MUX 406. The output of buffer amplifier 407 is proportional to the voltage across the LED in the selected channel, which is the difference between the LED voltage and the sense voltage. MUX 408 directs the output of buffer amplifier 407 to ADC 409, where it is converted into another digital value that maybe used to adjust signal density values in an associated SSDM module in stochastic controller 401. System 400 may also include a processor 412 to control stochastic controller 401 as well as multiplexers 402, 403, 406 and 408 (connections not shown). Processor 412 may be, for example, any suitable type of device known by those of ordinary skill in the art, such as a microprocessor or central processing unit, a controller, special-purpose processor, digital signal processor (DSP), an application specific integrated circuit (ASIC), a field programmable gate array (FPGA), or the like.

System 400 may also include a memory 413, which may be any suitable type of machine-readable storage medium, to store program instructions for processor 412, calibration data for the LEDs and buffer amplifiers, lookup tables for LED output versus current and junction temperature and the like. A machine-readable medium includes any mechanism for storing or transmitting information in a form (e.g., software, processing application) readable by a machine (e.g., a computer, processor, etc.). The machine-readable medium may include, but is not limited to, magnetic storage media, optical storage media, magneto-optical storage media, read-only memory (ROM), random-access memory (RAM), erasable programmable memory (e.g., EPROM and EEPROM), flash memory or another type of medium suitable for storing electronic instructions.

In one embodiment, stochastic controller 401, processor 412, memory 413, ADC 409, multiplexers 402, 403, 406 and 408, and buffer amplifiers 404, 405 and 407 may be implemented in a programmable mixed signal device 411 such as a programmable system on a chip (PsoC®) available from Cypress Semiconductor Corporation of San Jose, Calif.

System 400 may reside on a common carrier substrate such as, for example, an integrated circuit (IC) die substrate, a multi-chip module substrate, or the like. Alternatively, the components of system 400 may be one or more separate integrated circuits and/or discrete components.

Figure 5:
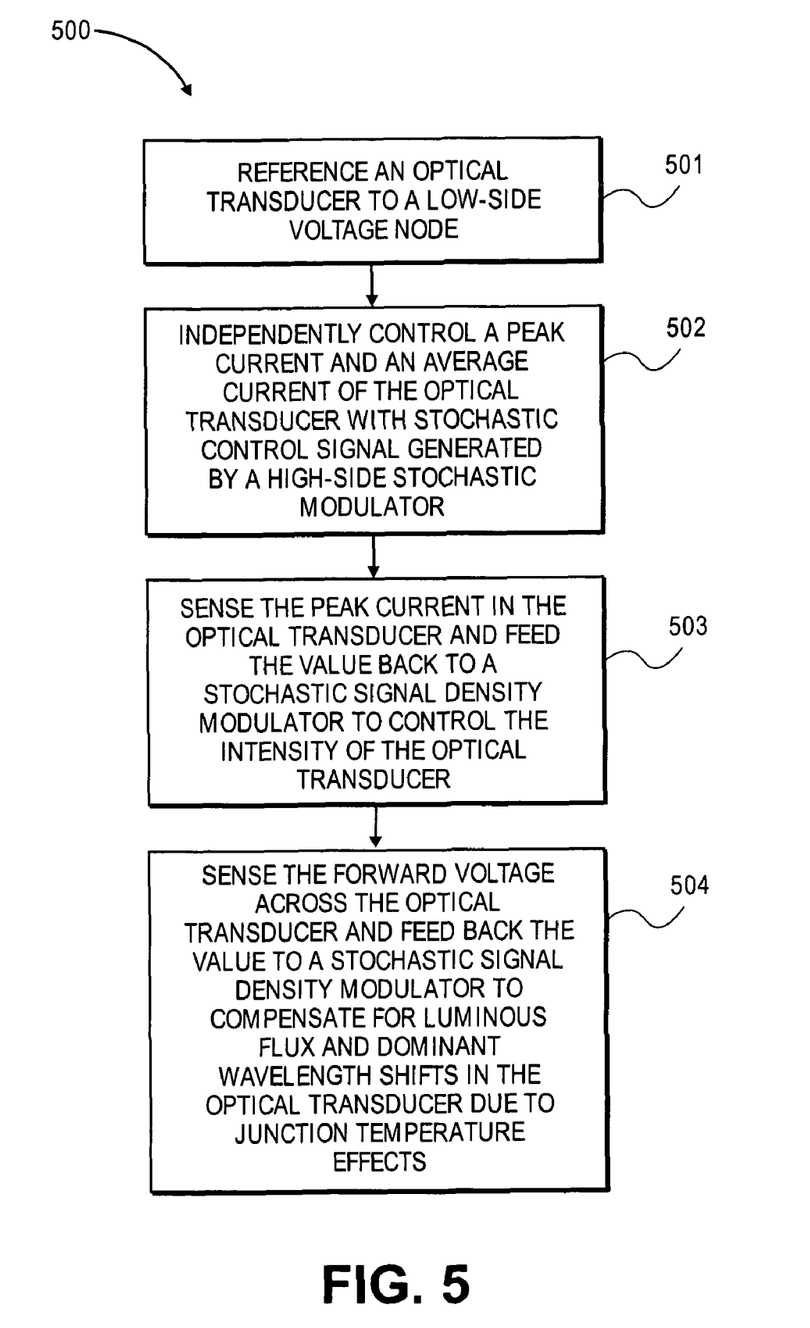
FIG. 5 is a flowchart illustrating a method for high-side stochastic control of an optical transducer in one embodiment.

FIG. 5 is a flowchart 500 illustrating a method according to one embodiment of the present invention. In operation 501, an optical transducer is referenced to a ground potential. In operation 502, the peak and average currents in the optical transducer are independently controlled with stochastic control signals generated by a high-side stochastic modulator. In operation 503, the peak current in the optical transducer is sensed and fed back to a stochastic signal density modulator to control the intensity of the optical transducer. In operation 504, the forward voltage across the optical transducer is sensed and fed back to a stochastic signal density modulator to correct for luminous flux and dominant wavelength shifts in the optical transducer due to junction temperature effects.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   referencing an optical transducer to a low-side voltage node; and
   independently controlling a peak current and an average current of the optical transducer with stochastic control signals generated by a high-side stochastic modulator, wherein independently controlling the peak current and the average current comprises:
   generating a first stochastic control signal with a first clock frequency;
   generating a second stochastic control signal with a second clock frequency; and
   combining the first stochastic control signal and the second stochastic control signal to generate a combined stochastic control signal.

2. The method of claim 1, wherein independently controlling the peak current and the average current further comprises:
   filtering the combined stochastic control signal with a low-pass filter to generate a filtered control signal, the low-pass filter including a cutoff frequency less than the first clock frequency and greater than the second clock frequency.

3. The method of claim 2, further comprising driving a controllable current supply with the filtered control signal, wherein a minimum value of the filtered control signal corresponds to an average value of the second stochastic control signal and a maximum value of the filtered control signal corresponds to a peak value of the first stochastic control signal.

4. The method of claim 3, further comprising:
generating an analog sense voltage proportional to the peak current;
converting the analog sense voltage to a digital value;
comparing the digital value with a first stored signal density value of the first stochastic control signal; and
correcting the first stored signal density value when the digital value differs from the first stored signal density value by more than a specified amount.

5. The method of claim 4, further comprising selecting a second stored signal density value associated with the second stochastic control signal, wherein the second stored signal density value corresponds to a specified percentage of the peak current.

6. The method of claim 1, wherein the optical transducer comprises a light-emitting diode (LED), the method further comprising:
measuring a forward voltage across the LED at a specified current level;
converting the forward voltage to an equivalent junction temperature of the LED; and
adjusting the peak current and the average current of the LED to compensate for changes in luminous flux and dominant wavelength of the LED due to the junction temperature of the LED.

7. The method of claim 1, wherein the low-side voltage node comprises a grounded node.

8. An apparatus, comprising:
a light-emitting diode (LED) referenced to a low-side voltage node;
a controllable current supply coupled to a high-potential side of the LED; and
a stochastic controller coupled to the controllable current supply, the stochastic controller configured to provide independent control of a peak current and an average current of the controllable current supply, wherein the stochastic controller comprises:
a first stochastic signal density modulator (SSDM) configured to generate a first stochastic control signal with a first clock frequency, to control the peak current of the controllable current supply;
a second SSDM configured to generate a second stochastic control signal with a second clock frequency, to control the average current of the controllable current supply; and
a combiner configured to logically combine the first stochastic control signal and the second stochastic control signal into a combined stochastic control signal.

9. The apparatus of claim 8, further comprising a lowpass filter coupled between the stochastic controller and the controllable current supply, wherein the lowpass filter includes a cutoff frequency less than the first clock frequency and greater than the second clock frequency.

10. The apparatus of claim 9, further comprising:
a sense resistor coupled between ground and the optical transducer to generate an analog sense voltage proportional to the peak current in the LED;
an analog to digital converter coupled between the sense resistor and the first SSDM to convert the analog sense voltage to a digital value, wherein the first SSDM is configured
to compare the digital value with a first stored signal density value of the first stochastic control signal and
to correct the first stored signal density value when the digital value differs from the first stored signal density value by more than a specified amount.

11. The apparatus of claim 10, wherein the second SSDM is configured to select a second stored signal density value associated with the second stochastic control signal, wherein the second stored signal density value corresponds to a specified percentage of the peak current.

12. The apparatus of claim 11, further comprising:
structure for measuring a forward voltage across the LED at a specified current level;
structure for converting the forward voltage to an equivalent junction temperature of the LED; and
structure for adjusting the peak current and the average current of the LED to compensate for changes in luminous flux and dominant wavelength of the LED due to the junction temperature of the LED.

13. The apparatus of claim 8, wherein each of the stochastic signal density modulators comprises:
a comparator comprising a first input, a second input and an output;
a stochastic counter, coupled to the first input of the comparator, to generate a plurality of stochastic values;
a signal density register, coupled to the second input of the comparator, to hold a signal density value, wherein the output of the comparator comprises a first output value if a stochastic value of the plurality of stochastic values is greater than the signal density value and wherein the output of the comparator comprises a second output value if the stochastic value of the plurality of stochastic values is less than or equal to the signal density value.

14. The apparatus of claim 8, wherein the low-side voltage node comprises a grounded node.

15. A system, comprising:
a plurality of optical transducers referenced to a ground potential;
a plurality of controllable current supplies, each coupled to a high-potential side of one of the plurality of optical transducers; and
a plurality of stochastic controllers coupled to the plurality of controllable current supplies, wherein each stochastic controller is configured to provide independent control of a peak current and an average current in one of the plurality of optical transducers.

16. The system of claim 15, wherein the plurality of optical transducers comprises a set of primary color optical transducers and wherein the plurality of stochastic controllers is configured to control a color mix of the plurality of optical transducers.

17. The system of claim 15, wherein the plurality of optical transducers comprises a set of complementary color optical transducers and wherein the plurality of stochastic controllers is configured to control a color mix of the plurality of optical transducers.

18. An apparatus, comprising:

means for referencing an optical transducer to a low-side voltage node; and means for independently controlling a peak current and an average current of the optical transducer with stochastic control signals generated by a high-side stochastic modulator, wherein the means for independently controlling the peak current and the average current comprises:

means for generating a first stochastic control signal with a first clock frequency;

means for generating a second stochastic control signal with a second clock frequency; and means for combining the first stochastic control signal and the second stochastic control signal to generate a combined stochastic control signal.

19. The apparatus of claim 18, wherein the optical transducer comprises a light-emitting diode (LED), the apparatus further comprising:

means for measuring a forward voltage across the LED at a specified current level;

means for converting the forward voltage to an equivalent junction temperature of the LED; and means for adjusting the peak current and the average current of the LED to compensate for changes in luminous flux and dominant wavelength of the LED due to the junction temperature of the LED.

* * * * *